United States Patent
Katayama et al.

(10) Patent No.: US 9,812,746 B2
(45) Date of Patent: Nov. 7, 2017

(54) VEHICLE BATTERY UNIT

(71) Applicant: HONDA MOTOR CO., LTD., Tokyo (JP)

(72) Inventors: Goichi Katayama, Wako (JP); Koichi Yamamoto, Wako (JP); Yasuaki Hotozuka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 462 days.

(21) Appl. No.: 14/357,265

(22) PCT Filed: Nov. 7, 2012

(86) PCT No.: PCT/JP2012/078845
§ 371 (c)(1),
(2) Date: May 9, 2014

(87) PCT Pub. No.: WO2013/073432
PCT Pub. Date: May 23, 2013

(65) Prior Publication Data
US 2014/0315064 A1  Oct. 23, 2014

(30) Foreign Application Priority Data

Nov. 14, 2011 (JP) ................... 2011-248900

(51) Int. Cl.
*H01M 10/6556* (2014.01)
*B60L 11/18* (2006.01)
(Continued)

(52) U.S. Cl.
CPC .......... *H01M 10/6556* (2015.04); *B60K 1/04* (2013.01); *B60L 1/003* (2013.01); *B60L 11/1864* (2013.01);
(Continued)

(58) Field of Classification Search
CPC ............ H01M 2/1083; H01M 10/625; H01M 10/6556; H01M 10/6554
See application file for complete search history.

(56) References Cited

U.S. PATENT DOCUMENTS 6,094,927 A * 8/2000 Anazawa ........... B60H 1/00278
62/239
7,824,797 B2  11/2010 Nishino et al.
(Continued)

FOREIGN PATENT DOCUMENTS

CN  101443950 A  5/2009
CN  101569053 A  10/2009
(Continued)

OTHER PUBLICATIONS

Machine translation of JP 2003002273 A, dated Jan. 8, 2003, retrieved May 3, 2016.*
(Continued)

*Primary Examiner* — Maria J Laios
*Assistant Examiner* — Robert S Carrico
(74) *Attorney, Agent, or Firm* — Westerman, Hattori, Daniels & Adrian, LLP

(57) ABSTRACT

A battery unit includes a battery and a battery case which accommodates the battery and which is disposed underneath a floor panel FP, and cooling air is introduced from an air intake port to cool the battery. In the battery case, a cooling space C which communicates with the air intake port is formed separately from a battery accommodation space M which accommodates the battery.

7 Claims, 8 Drawing Sheets

(51) Int. Cl.
*B60K 1/04* (2006.01)
*B60K 11/06* (2006.01)
*H01M 10/613* (2014.01)
*H01M 10/625* (2014.01)
*H01M 10/6554* (2014.01)
*H01M 10/6561* (2014.01)
*H01M 10/6563* (2014.01)
*H01M 10/6565* (2014.01)
*B60L 1/00* (2006.01)
*B60K 1/00* (2006.01)

(52) U.S. Cl.
CPC ....... *B60L 11/1868* (2013.01); *B60L 11/1874* (2013.01); *B60L 11/1875* (2013.01); *B60L 11/1877* (2013.01); *B60L 11/1879* (2013.01); *H01M 10/613* (2015.04); *H01M 10/625* (2015.04); *H01M 10/6554* (2015.04); *H01M 10/6561* (2015.04); *H01M 10/6563* (2015.04); *H01M 10/6565* (2015.04); *B60K 11/06* (2013.01); *B60K 2001/005* (2013.01); *B60K 2001/0438* (2013.01); *H01M 2220/20* (2013.01); *Y02T 10/7005* (2013.01); *Y02T 10/7061* (2013.01); *Y02T 10/7066* (2013.01); *Y02T 90/16* (2013.01)

(56) References Cited

U.S. PATENT DOCUMENTS

| | | | |
|---|---|---|---|
| 8,256,552 | B2 | 9/2012 | Okada |
| 8,387,733 | B2 | 3/2013 | Nakamura |
| 8,409,749 | B2 | 4/2013 | Nishino et al. |
| 8,888,572 | B2 | 11/2014 | Nakamura |
| 2009/0186266 | A1 | 7/2009 | Nishino et al. |
| 2009/0191451 | A1* | 7/2009 | Sato .................. H01M 2/1072 429/120 |
| 2010/0000816 | A1 | 1/2010 | Okada |
| 2010/0059208 | A1 | 3/2010 | Nakamura |
| 2010/0190044 | A1 | 7/2010 | Nishino et al. |
| 2010/0236854 | A1 | 9/2010 | Nakamura |
| 2010/0294580 | A1 | 11/2010 | Kubota et al. |
| 2011/0165830 | A1* | 7/2011 | Smith ................ B60H 1/00278 454/75 |
| 2012/0244404 | A1* | 9/2012 | Obasih ................ B60L 3/0046 429/99 |
| 2012/0263988 | A1* | 10/2012 | Obasih ................ H01M 10/625 429/98 |

FOREIGN PATENT DOCUMENTS

| | | |
|---|---|---|
| CN | 101626089 A | 1/2010 |
| CN | 101670775 A | 3/2010 |
| CN | 101925482 A | 12/2010 |
| JP | 11-178115 A | 7/1999 |
| JP | 2003-2273 A | 1/2003 |
| JP | 2007-305426 A | 11/2007 |
| JP | 2009-87646 A | 4/2009 |
| JP | 2011-187275 A | 9/2011 |
| WO | 2009/098953 A1 | 8/2009 |

OTHER PUBLICATIONS

International Search Report dated Feb. 5, 2013, issued in corresponding application No. PCT/JP2012/078845.
Office Action dated Dec. 1, 2015, issued in counterpart Chinese Application No. 201280054227.3, with partical English translation. (10 pages).

* cited by examiner

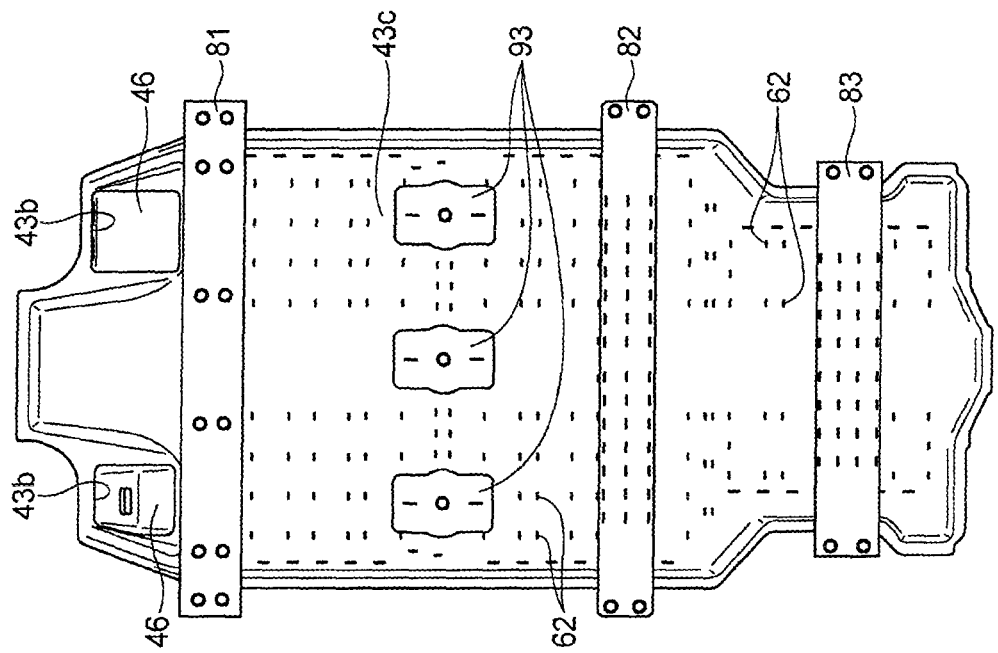
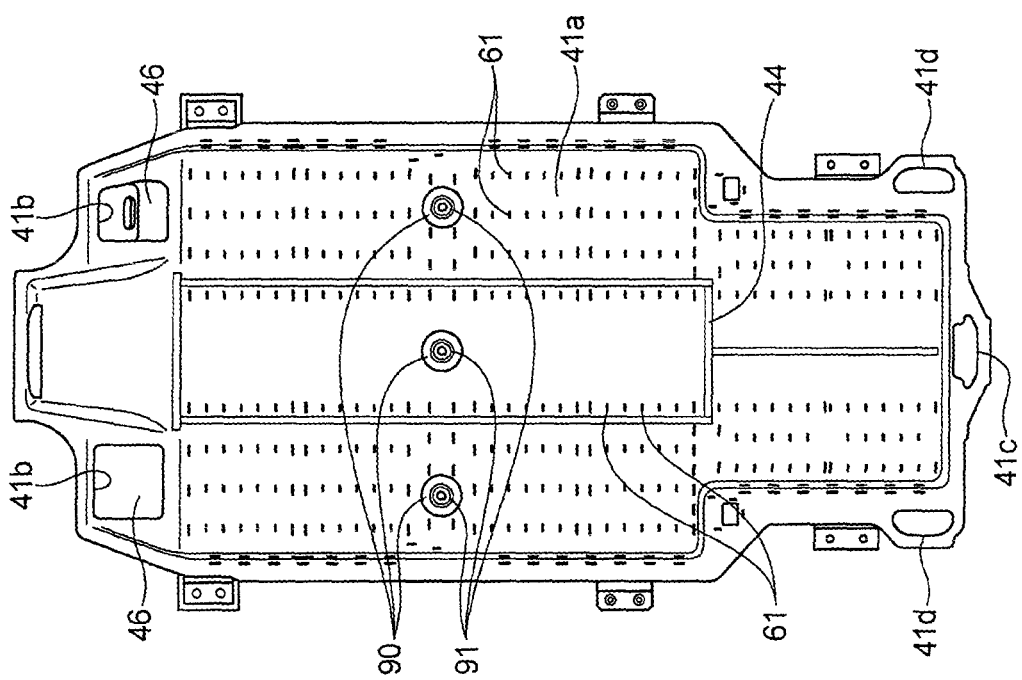

VEHICLE BATTERY UNIT

TECHNICAL FIELD

The present invention relates to a vehicle battery unit.

BACKGROUND ART

For example, a vehicle battery unit described in Patent Document 1 is known as a vehicle battery unit for use in an electric vehicle. In Patent Document 1, a battery unit is disposed underneath a floor panel of a vehicle. An air intake port is provided at a front of a battery case having a battery accommodation space where a battery is accommodated, and cooling air is taken into from the air intake port and is discharged from an air discharge port which is provided at a rear of the battery case, whereby a battery is cooled directly by the cooling air to restrain the battery from being heated.

Additionally, Patent Document 1 discloses a configuration in which a water absorbing member is disposed above a location where the formation of dew should be avoided in consideration of the influence of dew formed within the battery case to thereby prevent the occurrence of a drawback associated with the formation of dew.

RELATED ART DOCUMENT

Patent Document

Patent Document 1: JP-A-2009-87646

SUMMARY OF THE INVENTION

Problems to be Solved by the Invention

However, although Patent Document 1 describes that the influence of dew formed within the battery case is suppressed by disposing the water absorbing member, a problem is caused that the number of components is increased and the number of man-hours is also increased as a result of mounting the water absorbing member. Consequently, there is desired a mechanism which can suppress the intrusion of water into the battery accommodation space without disposing the water absorbing member. Additionally, in Patent Document 1, nothing is taken into consideration to deal with the entrance of foreign matters such as dust into the battery accommodation space from the air intake port.

The invention has been made in view of the problem described above, and an object thereof is to provide a vehicle battery unit which can suppress the entrance of foreign matters such as dust and the intrusion of water into a battery accommodation space where a battery is accommodated.

Means for Solving the Problems

With a view to achieving the object, there is provided a vehicle battery unit (for example, a battery unit 10 in an embodiment which will be described) including:

a battery (for example, a battery 11 in the embodiment); and a battery case (for example, a battery case 12 in the embodiment) which accommodates the battery and which is disposed underneath a floor panel (for example, a floor panel FP in the embodiment), wherein:

the battery is cooled by cooling air introduced from an air intake port (for example, an air intake port 33 in the embodiment); and a cooling space (for example, a cooling space C in the embodiment) which communicates with the air intake port is formed as a separate space from a battery accommodation space (for example, a battery accommodation space M in the embodiment) where the battery is accommodated in the battery case.

In addition, there is provided the vehicle battery unit according to Claim 1, wherein an upper plate (for example, an upper plate 41 in the embodiment) on an upper surface of which the battery is mounted, a lower plate (for example, a lower plate 43 in the embodiment), and a heat sink (for example, a heat sink 42 in the embodiment) which is disposed between the upper plate and the lower plate are located in the cooling space.

Additionally, there is provided the vehicle battery unit, wherein the lower plate and the heat sink as well as the upper plate and the heat sink are joined together through welding.

In addition, there is provided the vehicle battery unit, wherein a welding area between the upper plate and the heat sink is larger than a welding area between the lower plate and the heat sink.

Additionally, there is provided the vehicle battery unit, wherein the lower plate is fixed to a vehicle body.

In addition, there is provided the vehicle battery unit, wherein:

the battery case includes an upper cover (for example, an upper cover 21 in the embodiment) which has the cooling space and the battery accommodation space in an interior thereof and an under cover (for example, an under cover 22 in the embodiment); and the under cover is fastened to the lower plate with a bolt (for example, a bolt 66, a drain bolt 68 in the embodiment).

Additionally, there is provided the vehicle battery unit, wherein the air intake port is situated at a rear portion and above the battery case and is opened to the front.

In addition, there is provided the vehicle battery unit, wherein the air intake port is situated between the battery case and the floor panel.

Additionally, there is provided the vehicle battery unit according , wherein an air intake and discharge unit (for example, an air intake and discharge unit 13 in the embodiment) having the air intake port and an air discharge port (for example, an air discharge port 35 in the embodiment) which discharges the cooling air is attached to the battery case.

Advantage of the Invention

According to the invention described, it is possible to suppress the entrance of foreign matters such as dust and the intrusion of water into the battery accommodation space by forming the cooling space and the battery accommodation space as separate spaces in the battery case. Additionally, it is possible to lower the center of gravity of the vehicle due to the battery case being disposed below the floor panel.

According to the invention described, the number of components can be reduced by mounting the battery on the upper plate which defines the cooling space, whereby the fabrication can be facilitated at low costs.

According to the invention described, the different members can be fixed together in an ensured and easy fashion by joining them together through welding.

According to the invention described, the heat transfer area becomes larger on the upper plate side by making the welding area on the upper plate side where the battery is mounted larger than that on the lower plate side, whereby it is possible to cool the battery in an ensured fashion.

According to the invention described, possible to fix the battery case to the vehicle body in a more ensured fashion by fixing the lower plate to the vehicle body than by fixing the upper plate to the vehicle body, thereby making it possible to prevent the separation of the heat sink and the lower plate from the upper plate.

According to the invention described, the bolt with which the under cover and the lower cover are fastened together can be made to function as the drain bolt.

According to the invention described, it is possible to suppress not only the entrance of foreign matters such as dust but also the intrusion of water into the cooling space.

According to the invention described, possible to suppress not only the entrance of foreign matters such as dust but also the intrusion of water into the cooling space.

According to the invention described, by forming the air intake and discharge unit having the air intake port and the air discharge port separately from the battery case, it is possible to enhance the degree of freedom in layout and handling properties.

BRIEF DESCRIPTION OF THE DRAWINGS

FIG. 6A is a view of an upper plate to which the heat sink is welded as seen from thereabove, and FIG. 6B is a view of a lower plate to which the heat sink is welded as seen from therebelow.

MODES FOR CARRYING OUT THE INVENTION

Figure 1:
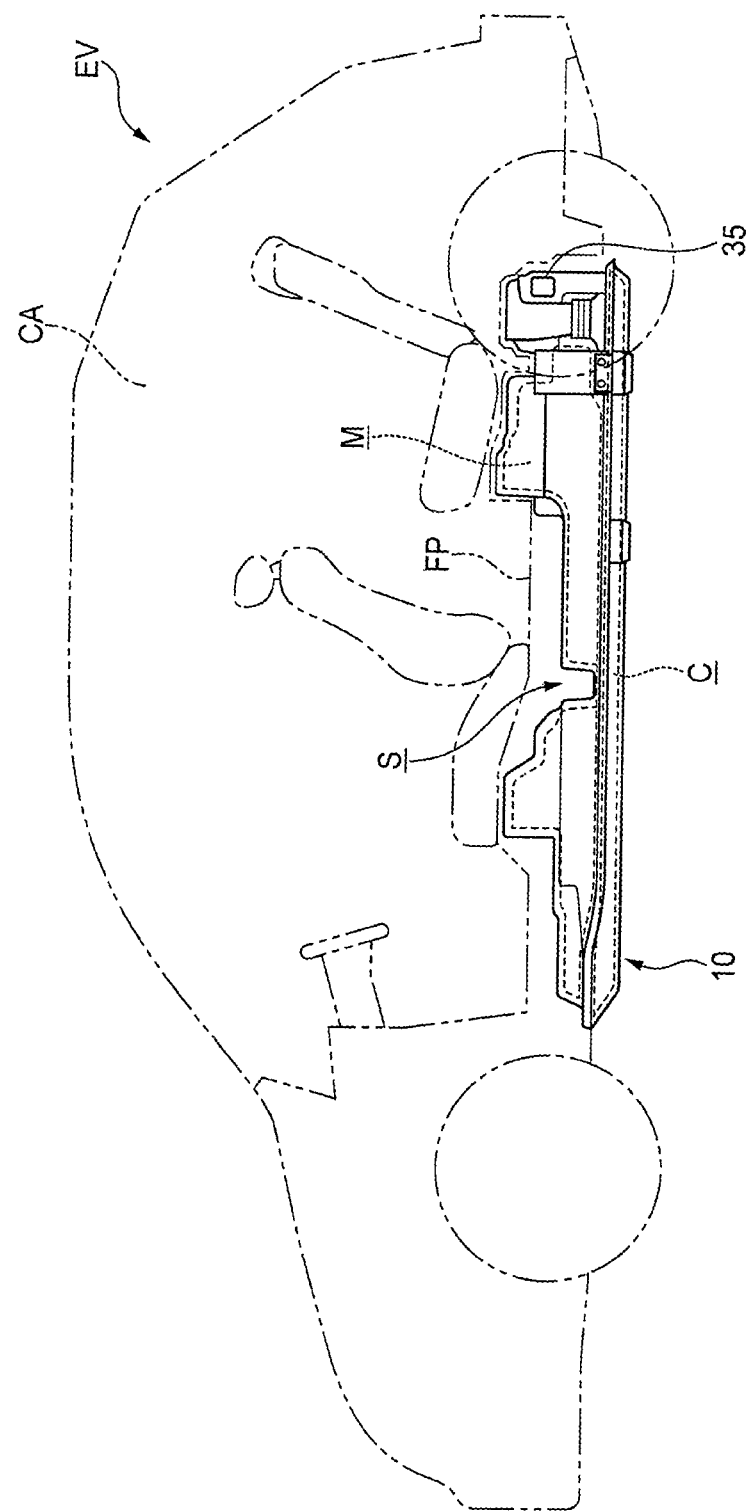
FIG. 1 is a drawing showing a state in which a battery unit of an embodiment according to the invention is mounted on a vehicle.
Figure 2:
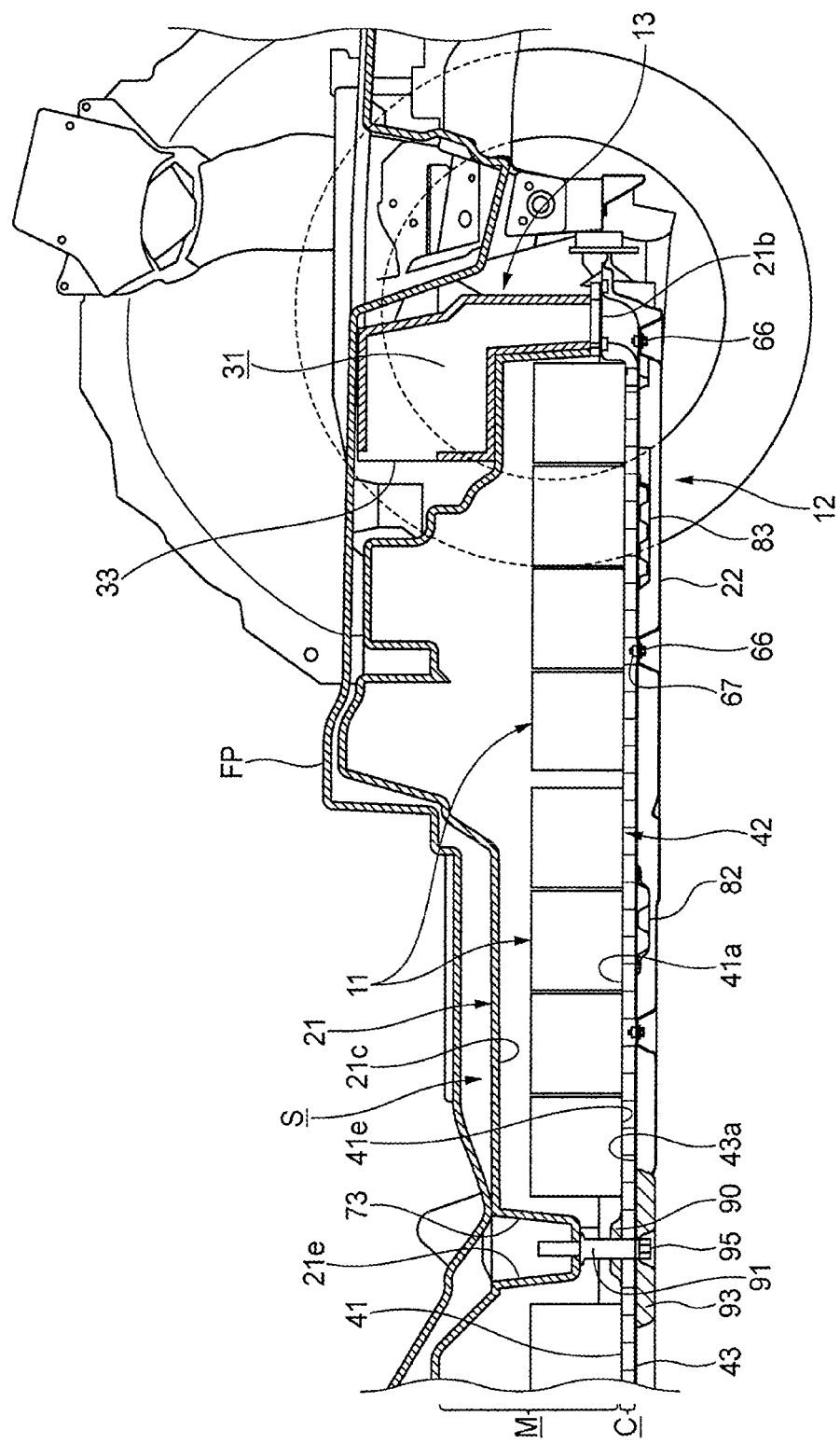
FIG. 2 is a partial sectional view of the battery unit which is mounted on the vehicle.

As shown in FIGS. 1 and 2, a vehicle battery unit 10 according to an embodiment of the invention is provided in an under-floor space S which is positioned underneath a floor panel FP of a vehicle such as an electric vehicle EV, for example. The under-floor space S is separated from a cabin CA via the floor panel FP. It is noted that as the vehicle, various types of vehicles which can be driven by a motor including a hybrid vehicle can be adopted in addition to the electric vehicle.

The battery unit 10 includes a battery 11, a battery case 12 which accommodates the battery 11, and an air intake and discharge unit 13 which is attached to a rear and an upper portion of the battery case 12.

Figure 3:
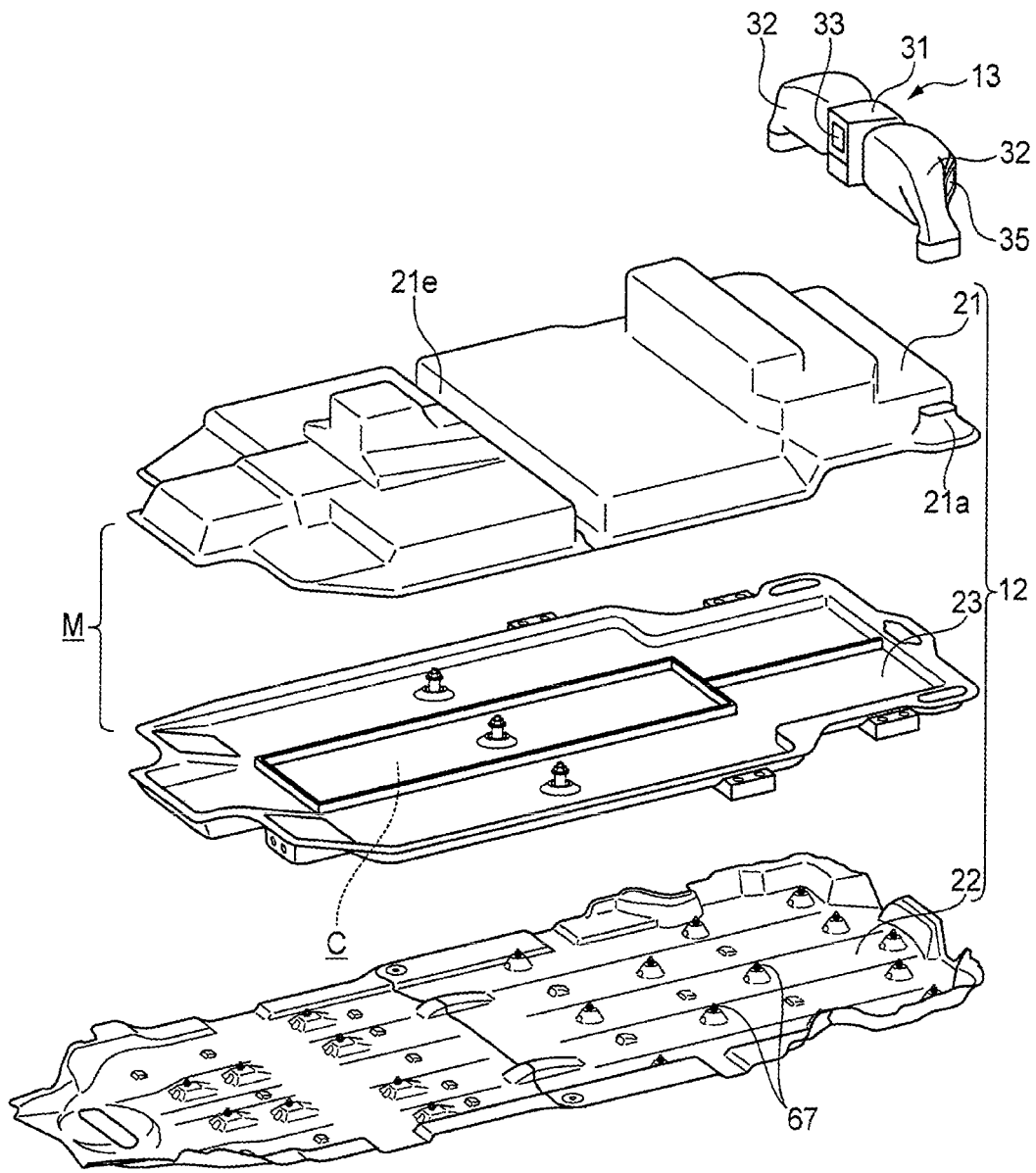
FIG. 3 is an exploded perspective view of the battery unit.

In the battery case 12, as shown in FIG. 3, a shell is formed by an upper cover 21 and an under cover 22, and a heat sink assembly 23 is provided in an interior space of the battery case 12 which is formed by the upper cover 21 and the under cover 22. The interior space of the battery case 12 is divided into a battery accommodation space M which accommodates the battery 11 and a cooling space C into which cooling air is introduced. A pair of air discharge communicating portions 21a, 21a (only one of them being shown) which communicate with the cooling space C into which cooling air is introduced are formed into a cylindrical shape at both lateral end portions of a rear portion of the upper cover 21, and an air intake communicating portion 21b is opened in a central portion (refer to FIG. 2). The pair of air discharge communicating portions 21a, 21a and the air intake communicating portion 21b are connected to the air intake and discharge unit 13 which is attached to the battery case 12.

The air intake and discharge unit 13 includes, as constituent units thereof, an air intake passage 31 which communicates with the air intake communicating portion 21b of the upper cover 21 and air discharge passages 32, 32 which are situated at both sides of the air intake passage 31 and which communicate with the air discharge communicating portions 21a, 21a of the upper cover 21, respectively, and is attached to the rear and the upper portion of the battery case 12. The air intake and discharge unit 13 is also disposed in the under-floor space S as the battery case 12 is done.

In the air intake passage 31, an air intake port 33 which is an entrance to the air intake passage 31 is situated at the front of the air intake and discharge unit 13 and is opened to the front of the vehicle. Suction cooling fans, not shown, are installed in interiors of the air discharge passages 32, 32, and air discharge ports 35 (only one of them being shown) which are exits of the air discharge passages 32, 32 are situated individually at the rear of the air intake and discharge unit 13 and are opened outwards in a widthwise direction of the vehicle.

Consequently, cooling air taken into from the air intake port 33 passes through the air intake passage 31 and is then supplied into the cooling space C from the air intake communicating portion 21b. On the contrary, cooling air from the cooling space C passes through the air discharge passages 32, 32 from the air discharge communicating portions 21a, 21a of the upper cover 21 and is then discharged from the air discharge ports 35, 35.

Figure 4:
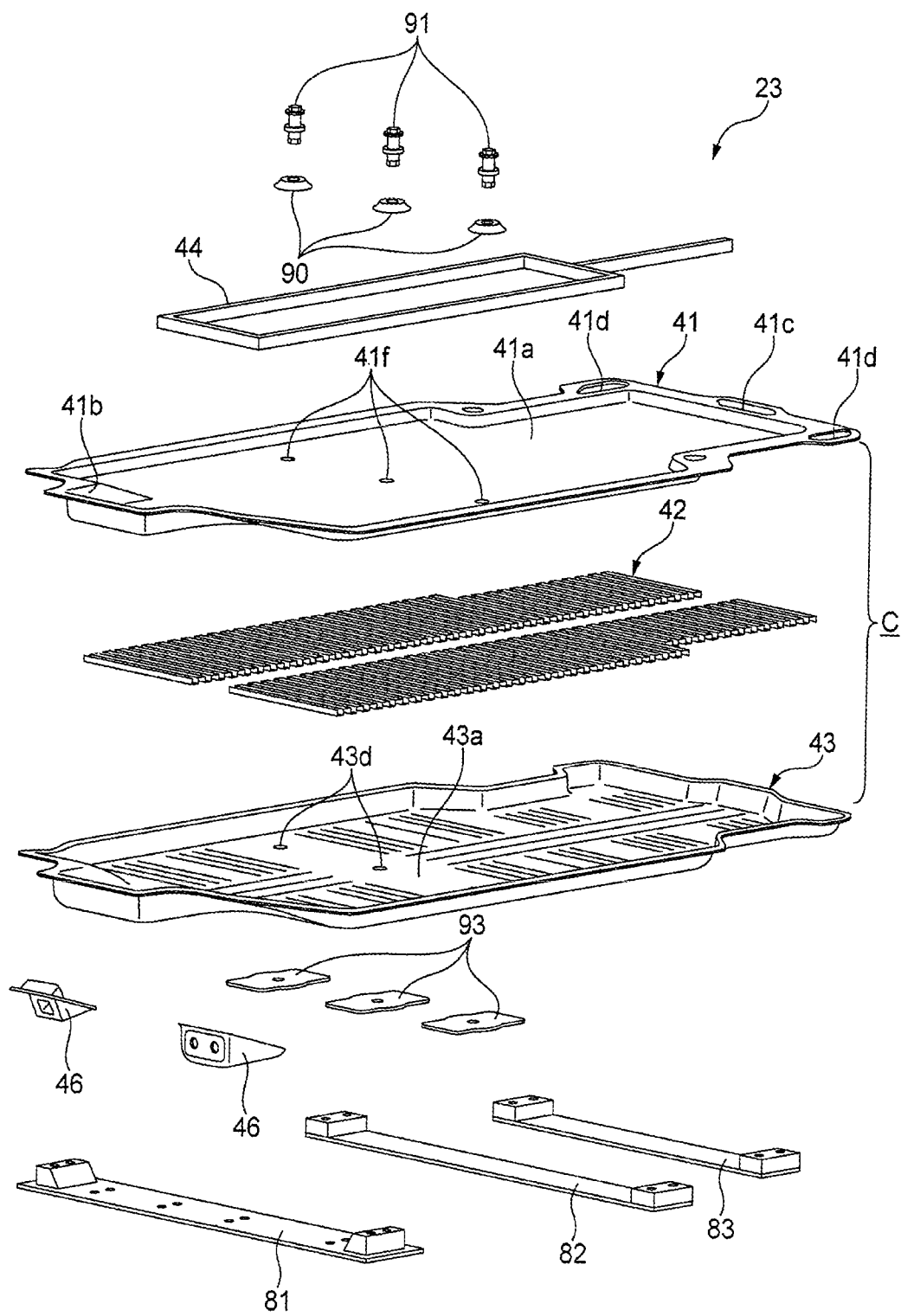
FIG. 4 is an exploded perspective view of a heat sink assembly.

In the heat sink assembly 23 which is provided in an interior of the battery case 12, as shown in FIG. 4, an upper plate 41, a heat sink 42 and a lower plate 43 are aligned sequentially in this order from top, and an upper surface 41a of the upper plate 41 faces a rear surface 21c of the upper cover 21, whereby the battery accommodation space 14 is defined (refer to FIG. 1).

A rectangular frame 44 is attached to the upper surface 41a of the upper plate 41, so that a plurality of batteries 11 are mounted thereon. A pair of openings 41b, 41b are formed in both lateral sides of a front end portion of the upper plate 41 (also, refer to FIG. 6(a)). Additionally, at a rear end portion of the upper plate 41, an opening 41c which communicates with the air intake communicating portion 21b of the upper cover 21 is formed in a lateral center, and a pair of openings 41d, 41d which communicate with the air discharge communicating portions 21a, 21a of the upper cover 21, respectively, are formed in both lateral sides.

The lower plate 43 has substantially the same shape as that of the upper plate 41, and the cooling space C is defined by a lower surface 41e of the upper plate 41 and an upper surface 43a of the lower plate 43 (refer to FIG. 1). Openings 43b, 43b are formed at a front end portion of the lower plate 43 in positions which corresponds to the openings 41b, 41b of the upper plate 41 (also, refer to FIG. 6(b)), and 12V•DC housings 46, 46 are assembled thereto.

The 12V•DC housings 46, 46 are exposed to the cooling space C from the pair of openings 41b, 41b which are formed in the upper plate 41, so that 12V batteries, not shown, which are accommodated together with the batteries 11 in the battery accommodation space M can be accessed from the outside. It is noted that the pair of openings 41b, 41b which are formed in the upper plate 41 are closed by the 12V•DC housings 46, 46, whereby the battery accommodation space M which is defined by the upper surface 41a of the upper plate 41 and the rear surface 21c of the upper cover 21 does not communicate with the cooling space C which is defined by the lower surface 41e of the upper plate 41 and the upper surface 43a of the lower plate 43, so that both the spaces are formed as independent spaces.

Figure 5:
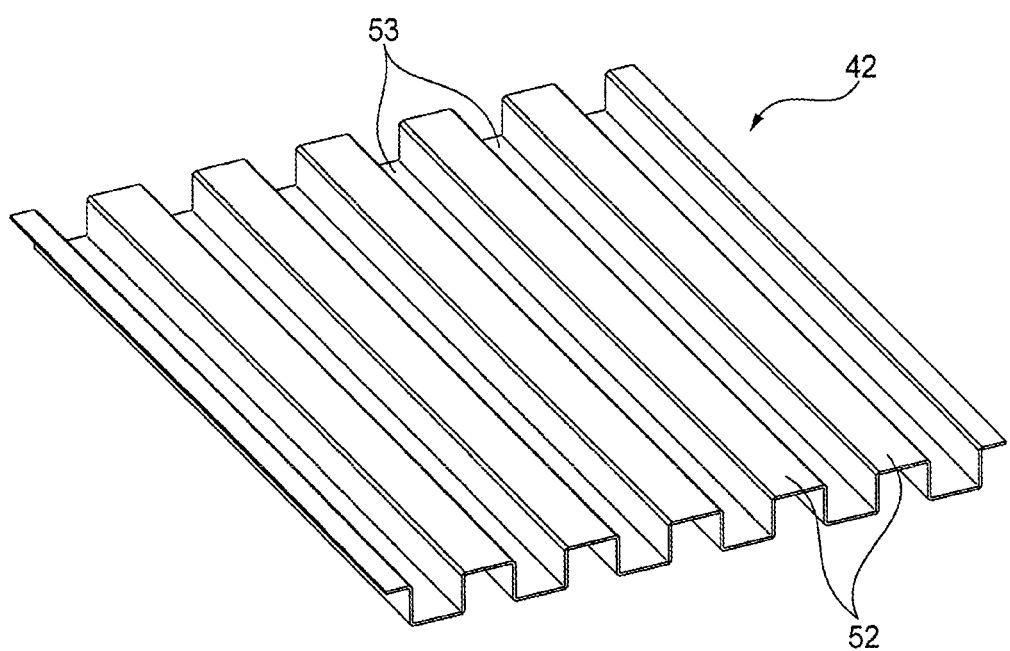
FIG. 5 is a partial perspective view of a cooling portion of a heat sink.

The heat sink 42 is provided in the cooling space C which is defined by the lower surface 41e of the upper plate 41 and the upper surface 43a of the lower plate 43. The heat sink 42 is made of stainless steel, for example, and includes, as shown in FIG. 5, pluralities of projecting portions 52 and recess portions 53 which are arranged alternately and continuously in a wave-like fashion. By forming the heat sink 42 into the wave-like form by the pluralities of projecting portions 52 and recess portions 53, a contact area with cooling air can be increased. Additionally, by forming flat upper surfaces of the projecting portions 52 and lower surfaces of the recess portions 53, welding spots, which will be described later, are ensured.

The heat sink 42 and the upper plate 41 are joined together strongly and rigidly by welding the lower surface 43e of the upper plate 41 and the projecting portions 52 of the heat sink 42 which are in contact with the lower surface 41e of the upper plate 41 together, as shown in FIG. 6(a). Reference numeral 61 denotes a welding spot.

On the other hand, the heat sink 42 and the lower plate 43 are joined together strongly and rigidly by welding the upper surface 43a of the lower plate 43 and the recess portions 53 of the heat sink 42 which are in contact with the upper surface 43a of the lower plate 43 together, as in FIG. 6(b). Reference numeral 62 denotes a welding spot.

The different members can be fixed together in an ensured and easy fashion by welding the heat sink 42 and the upper plate 41 together, as well as the heat sink 42 and the lower plate 43 together. Here, the welding area between the upper plate 41 and the heat sink 42 is larger than the welding area between the lower plate 43 and the heat sink 42. This is because welding the lower plate 43 and the heat sink 42 together is intended to enhance the rigidity thereof through joining both the members together, whereas welding the upper plate 41 and the heat sink 42 together is intended not only to enhance the rigidity thereof by joining both the members together but also to enhance the heat conductivity between the upper plate 41 and the heat sink 42. By adopting this configuration, the heat transfer area becomes larger on the upper plate 41 side than on the lower plate 43 side. Consequently, cooling air taken in from the air intake port 33 in the air intake and discharge unit 13 is brought into contact with the heat sink 42 to cool the heat sink 42, whereby the batteries 11 are cooled via the upper plate 41. Thereafter, the cooling air passes through the pair of openings 41d, 41d which are formed in the upper plate 41 and is then introduced into the air discharge passages 32, 32 of the air intake and discharge unit 13.

The under cover 22 is fastened to a lower side of the lower plate 43 with bolts 66 so as to cover the whole of the lower surface of the lower plate 43. Nuts 67 are fixed in advance to the lower plate 43 in positions through which the bolts 66 are inserted, and the under cover 22 is fixed to the lower plate 43 by screwing the bolts 66 into the nuts 67 from a lower surface side of the under cover 22. It is noted that the upper cover 21 is fixed to circumferential edge portions of the upper plate 41 and the lower plate 43 with bolts, not shown.

The battery unit 10 which is configured in the way described above is fixed to the vehicle body before the under cover 22 is fastened to the lower plate 43 with the bolts 66.

Figure 7:
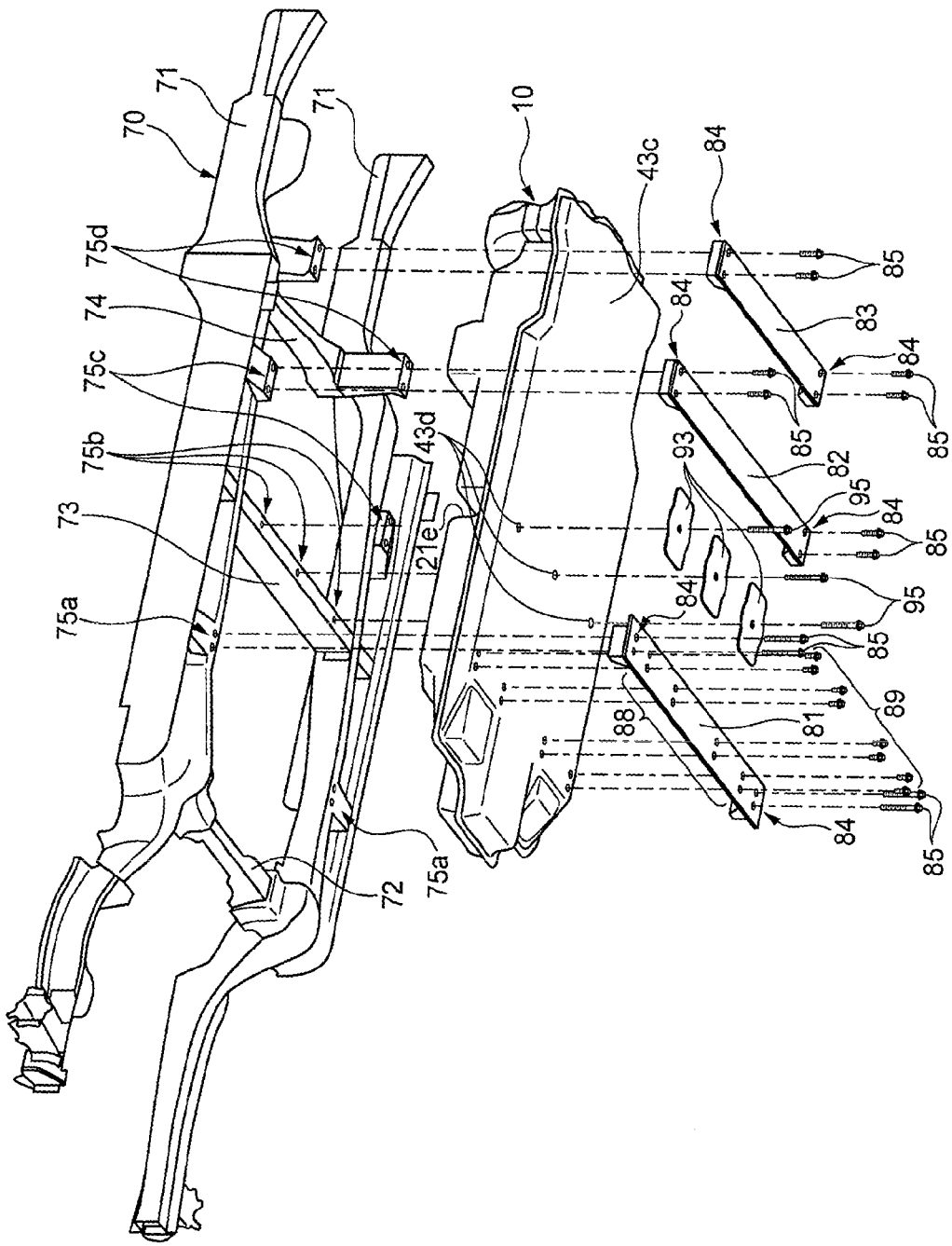
FIG. 7 is an exploded perspective view of a frame structure of the vehicle shown in FIG. 1 and the battery unit.

FIG. 7 shows a frame structure 70 which makes up a framework of a lower part of the vehicle body and the battery unit 10 which is attached to the frame structure 70. Although not shown in FIG. 7, the floor panel FP is fixed on to an upper portion of the frame structure 70 through welding.

The frame structure 70 includes a pair of left and right side members 71, 71 which extend in a longitudinal direction of the vehicle body and cross members 72, 73, 74 which extend in a widthwise direction of the vehicle. The cross member 72, 73, 74 are fixed to the side members 71, 71 in predetermined positions through welding.

Fastening portions 75a, 75a are provided individually on the side members 71, 71 between the front cross member 72 and the central cross member 73. Fastening portions 75b, 75b, 75b are provided on the central cross member 73 between the side members 71, 71. Fastening portions 75c, 75c are provided individually on the side members 71, 71 between the central cross member 73 and the rear cross member 74. Fastening portions 75d, 75d are provided individually at both ends of the rear cross member 74.

Support brackets 81, 82, 83 which extends in the widthwise direction of the vehicle are disposed on a lower surface 43c of the lower plate 43 so as to project from both sides of the lower plate 43, and a pair of bolt fastening holes 84, 84 are provided individually in both end portions of each of the support brackets 81, 82, 83. The front support bracket 81 is fastened to the fastening portions 75a with bolts 85, the central support bracket 82 is fastened to the fastening portions 75c with bolts 85, and the rear support bracket 83 is fastened to the fastening portions 75d with bolts 85. Additionally, a plurality of fastening holes 88 are formed in the front support bracket 81 between the bolt fastening holes 84, 84 which are provided in the lateral ends of the front support bracket 81, so that the front support bracket 81 is also fastened to the lower plate 43 with bolts 89.

In addition, three fastening holes 43d, 43d, 43d are formed in the widthwise direction of the vehicle in the lower plate 43 in a position which corresponds to the central cross member 73, and a substantially rectangular rigid plates 93 are provided individually around the fastening holes 43d, 43d, 43d in the lower surface 43c of the lower plate 43. Additionally, through holes, not shown, are formed in the heat sink 42 in positions which correspond to the fastening holes 43d, 43d, 43d in the lower plate 43. Fastening holes 41f, 41f, 41f are formed in the upper plate 41 in positions which correspond to the fastening holes 43d, 43d, 43d in the lower plate 43 (also, refer to FIG. 4), and circular disk-shaped cups 90 and hollow collars 91 which are positioned by the cups 90 are provided individually around the fastening holes 41f, 41f, 41f. A recess portion 21e which accommodates the central cross member 73 is formed on the upper cover 21 in a position which corresponds to the central cross member 73, and fastening holes, not shown, are formed in the upper cover 21 in positions which correspond to the fastening holes 43d, 43d, 43d in the lower plate 43. Bolts 95 are inserted into the fastening holes 43d, 43d, 43d via the rigid plates 93 from a lower surface 43c side of the lower plate 43, whereby the bolts 95 pass through the through holes in the heat sink 42 and are then inserted through the cups 90 and the collars 91 to be fixed in place in the fastening portions 75b of the central cross member 73.

The lower plate 43 is fixed to the frame structure 70 of the vehicle body in this way, whereby the battery unit 10 is supported in the under-floor space S which is situated underneath the floor panel FP so as to be substantially parallel to the ground. Consequently, the battery case 12 can be fixed to the vehicle body in a more ensured fashion than when the upper plate 41 is fixed to the vehicle body, thereby making it possible to prevent the separation of the heat sink 42 and the lower plate 43 from the upper plate 41.

Figure 8:
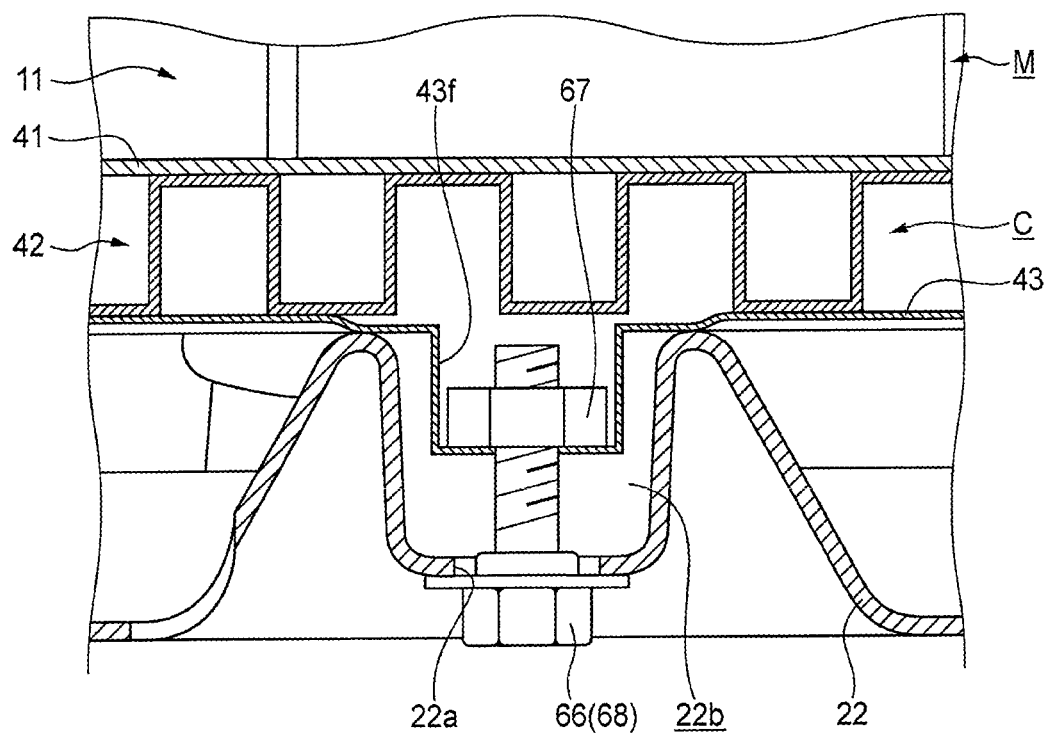
FIG. 8 is a sectional view showing an example in which a bolt with which the lower plate and an under cover are fastened together is configured as a drain bolt.

Additionally, at least one of the bolts 66 with which the lower plate 43 and the under cover 22 are fastened together is preferably configured as a drain bolt 68. As this occurs, as shown in FIG. 8, a concavely recessed reservoir portion 43f which is accommodated in a recess portion 22b formed in the under cover 22 is formed in the lower plate 43 at a portion to which the drain bolt 68 is to be fixed, and a nut 67 is fixed within the reservoir portion 43f. Consequently, should fluid such as water intrude into the cooling space C, the fluid such as water is allowed stay within the reservoir portion 43f. Then, the fluid staying in the reservoir 43f can be discharged to the outside of the battery unit 10 from a bolt fastening hole 22a in the under cover 22.

In the battery unit 10 of the embodiment which is configured in the way described above, a negative pressure relative to the air intake port 33 is produced in the cooling space C by the cooling fans, not shown, which are provided in the air discharge passages 32, 32 of the air intake and discharge unit 13. Consequently, outside air is taken in from the air intake port 33 as cooling air, and the cooling air so taken in passes through the air intake passage 31 and then passes through the air intake communicating portion 21b of the upper cover 21 and the opening 41c in the upper plate 41 to be supplied into the cooling space C.

The cooling air which flows into the cooling space C comes into contact with the heat sink 42 to thereby cool the batteries 11 via the welding spots 61 on the upper plate 41. Then, the cooling air passes through the pair of openings 41d, 41d which are formed in the upper plate 41 to be introduced into the aid discharging communicating portions 21a, 21a of the upper cover 21 and the air discharge passages 32, 32 in the air intake and discharge unit 13 and is discharged from the air discharge ports 35, 35.

As this occurs, since the battery accommodating space M and the cooling space C are formed as separate spaces within the battery case 12, even though foreign matters such as dust enter or even though water intrudes from the air intake port 33, the entrance of such foreign matters and water into the battery accommodation space M is avoided.

It is noted that the invention is not limited to the embodiment that has been described heretofore and hence can be modified, improved or the like as required.

Namely, any configuration can be adopted in this invention as long as the battery accommodation space M and the cooling space C are formed as separate spaces within the battery case 12.

This patent application is based on Japanese Patent Application (No. 2011-248900), the contents of which are incorporated herein by reference.

DESCRIPTION OF REFERENCE NUMERALS 10 battery unit;
11 battery;
12 battery case;
13 air intake and discharge unit;
21 upper cover;
22 lower cover;
33 air intake port;
35 air discharge port;
41 upper plate;
42 heat sink;
43 lower plate
FP floor panel;
C cooling space;
M battery accommodation space.

The invention claimed is:

1. A vehicle battery unit comprising:
a battery; and
a battery case which accommodates the battery and which is disposed underneath a floor panel,
wherein the battery is cooled by cooling air introduced from an air intake port;
wherein a cooling space which communicates with the air intake port is formed as a separate space from a battery accommodation space where the battery is accommodated in the battery case;
wherein the battery is an angular battery;
wherein an upper plate on an upper surface of which the battery is mounted, a lower plate, and a heat sink which is disposed between the upper plate and the lower plate are located in the cooling space;
wherein the air intake port is situated only at a rear portion of the battery case and above the battery case and is opened to the front toward a vehicle front direction;
wherein an upper cover of the battery case has a convex portion projecting toward the floor panel;
wherein the air intake port is disposed behind the convex portion; and
wherein the air intake port is disposed below the floor panel.

2. The vehicle battery unit according to claim 1, wherein the lower plate and the heat sink as well as the upper plate and the heat sink are joined together through welding.

3. The vehicle battery unit according to claim 2, wherein a welding area between the upper plate and the heat sink is larger than a welding area between the lower plate and the heat sink.

4. The vehicle battery unit according to claim 1, wherein the lower plate is fixed to a vehicle body.

5. The vehicle battery unit according to claim 1, wherein the battery case comprises the upper cover which has the cooling space and the battery accommodation space in an interior thereof and an under cover, and in that the under cover is fastened to the lower plate with a bolt.

6. The vehicle battery unit according to claim 1, wherein the air intake port is situated between the battery case and the floor panel.

7. The vehicle battery unit according to claim 1, wherein an air intake and discharge unit having the air intake port and an air discharge port which discharges the cooling air is attached to the battery case.

* * * * *